United States Patent
Li (10) Patent No.: US 11,999,238 B2
(45) Date of Patent: Jun. 4, 2024

(54) ENGINE SYSTEM AND ALL-TERRAIN VEHICLE

(71) Applicant: SEGWAY TECHNOLOGY CO., LTD., Changzhou (CN)

(72) Inventor: Li Li, Changzhou (CN)

(73) Assignee: SEGWAY TECHNOLOGY CO., LTD., Changzhou (CN)

( * ) Notice: Subject to any disclaimer, the term of this patent is extended or adjusted under 35 U.S.C. 154(b) by 99 days.

(21) Appl. No.: 17/882,222

(22) Filed: Aug. 5, 2022

(65) Prior Publication Data

US 2022/0379713 A1 Dec. 1, 2022

Related U.S. Application Data

(63) Continuation of application No. PCT/CN2021/076489, filed on Feb. 10, 2021.

(30) Foreign Application Priority Data

Feb. 26, 2020 (CN) ......................... 202020215232.X (51) Int. Cl.
*B60K 6/40* (2007.10)
*B60K 6/24* (2007.10)
(Continued)

(52) U.S. Cl.
CPC ................. *B60K 6/40* (2013.01); *B60K 6/24* (2013.01); *B60K 6/26* (2013.01); *B60K 6/442* (2013.01);
(Continued)

(58) Field of Classification Search
CPC ... B60K 6/40; B60K 6/24; B60K 6/26; B60K 6/442; B60K 6/543; B60K 2006/266; B60Y 2200/20
See application file for complete search history.

(56) References Cited

U.S. PATENT DOCUMENTS

| | | | | |
|---|---|---|---|---|
| 7,223,200 B2* | 5/2007 | Kojima | ................... | B60K 6/40 |
| | | | | 475/5 |
| 8,734,281 B2* | 5/2014 | Ai | ......................... | B60K 6/365 |
| | | | | 475/5 |

FOREIGN PATENT DOCUMENTS

| CN | 1413855 A | 4/2003 |
|---|---|---|
| CN | 101451596 A | 6/2009 |

(Continued)

OTHER PUBLICATIONS

International search report of PCT Patent Application No. PCT/CN2021/076489 issued on May 17, 2021.

*Primary Examiner* — John D Walters
(74) *Attorney, Agent, or Firm* — Emerson, Thomson & Bennett, LLC; Roger D. Emerson; Matt J. Wilson (57) ABSTRACT

An engine system comprising: a housing having an accommodating cavity; a crankshaft part, a speed change mechanism and a transmission shaft are provided in the accommodating cavity; and a first motor and a second motor are located outside the accommodating cavity and provided on the housing. The crankshaft part is provided in the accommodating cavity and outputs first power. The first motor comprises a first motor shaft which is connected to an output end of the crankshaft part to convert the first power into electric energy. The second motor comprises a second motor shaft and is configured to output second power according to electric energy. The speed change mechanism is drivingly connected to the second motor shaft without connecting the output end of the crankshaft part. The transmission shaft is connected to an output end of the speed change mechanism. Also disclosed is an all-terrain vehicle.

20 Claims, 4 Drawing Sheets

(51) Int. Cl.
*B60K 6/26* (2007.10)
*B60K 6/442* (2007.10)
*B60K 6/543* (2007.10)

(52) U.S. Cl.
CPC ........ *B60K 6/543* (2013.01); *B60K 2006/266* (2013.01); *B60Y 2200/20* (2013.01)

(56) References Cited

FOREIGN PATENT DOCUMENTS

CN          102975607 A    3/2013
WO    WO2020025774 A1    2/2020

\* cited by examiner

ENGINE SYSTEM AND ALL-TERRAIN VEHICLE

CROSS REFERENCE TO RELATED APPLICATION

The present disclosure is a continuation of international application No. PCT/CN2021/076489 filed on Feb. 10, 2021, which is based on the Chinese Patent Application No. 202020215232.X filed on Feb. 26, 2020, and claims the priority of the Chinese Patent Application, the disclosure of which is incorporated by reference herein in its entirety.

TECHNICAL FIELD

The present disclosure relates to the technical field of machinery, in particular to an engine system and a vehicle.

BACKGROUND

With the continuous development of science and technology, the types and functions of automobiles are gradually increasing, such as an all-terrain vehicle. An all-terrain vehicle refers to the vehicle that can travel on any terrain. For example, in the wild environment, on the terrain where it is difficult for ordinary vehicles to move, the all-terrain vehicle can still travel freely. The all-terrain vehicle has been favored by the market for its excellent ability to travel in the field.

Most of the existing all-terrain vehicles are powered by a fuel engine or a motor. A pure fuel engine has a strong driving ability, but there are some problems such as large exhaust emissions. For the driving of a pure motor, there are problems such as endurance and field charging.

SUMMARY

In view of the above problems, the present disclosure has been made in order to provide an engine system and a vehicle to solve or improve the above problems.

In an embodiment of the present disclosure, an engine system is provided, comprising: a housing, which is provided with an accommodating cavity; a crankshaft part, which is provided in the accommodating cavity and is configured to output first power, wherein an output end of the crankshaft part for outputting the first power extends out of the accommodating cavity; a first motor, which is located outside the accommodating cavity and provided on the housing, wherein the first motor comprises a first motor shaft, and the first motor shaft is connected to the output end of the crankshaft part to convert the first power into electric energy; a second motor, which is located outside the accommodating cavity and provided on the housing, wherein the second motor comprises a second motor shaft and is configured to output second power according to electric energy; a speed change mechanism, which is provided in the accommodating cavity and drivingly connected to the second motor shaft without connecting to the output end of the crankshaft part, and is configured to perform speed change processing on the second power to output third power; and a transmission shaft, which is provided in the accommodating cavity and connected to an output end of the speed change mechanism for outputting the third power, and is configured to output fourth power.

In another embodiment of the present disclosure, another engine system is provided, comprising: an engine, which comprises a housing and a crankshaft part, wherein the housing is provided with an accommodating cavity, the crankshaft part is provided in the accommodating cavity and is configured to output first power, and an output end of the crankshaft part for outputting the first power extends out of the accommodating cavity; a first motor, which is located outside the accommodating cavity and provided on the housing, wherein the first motor comprises a first motor shaft, and the first motor shaft is connected to the output end of the crankshaft part to convert the first power into electric energy; a second motor, which is located outside the accommodating cavity and provided on the housing, wherein the second motor comprises a second motor shaft and is configured to output second power according to electric energy; a speed change mechanism, which is provided in the accommodating cavity and drivingly connected to the second motor shaft without connecting to the output end of the crankshaft part, and is configured to perform speed change processing on the second power to output third power; and a transmission shaft, which is provided in the accommodating cavity and connected to an output end of the speed change mechanism for outputting the third power, and is configured to output fourth power.

Preferably, the first motor and the second motor are located on the same side of the axis of the transmission shaft, and the first motor shaft and the second motor shaft are parallel to each other.

Preferably, the first motor and the second motor are located on one side of the axis of the transmission shaft, and the speed change mechanism is located on the other side of the axis of the transmission shaft.

Preferably, both the second motor shaft and the first motor shaft are perpendicular to the transmission shaft.

Preferably, the first motor and the second motor are located on the same side of the axis of the transmission shaft, and the first motor shaft and the second motor shaft are perpendicular to each other.

Preferably, the first motor, the second motor and the speed change mechanism are located on one side of the axis of the transmission shaft, and a counterweight of the crankshaft part is located on the other side of the axis of the transmission shaft.

Preferably, the first motor shaft is perpendicular to the transmission shaft, and the second motor shaft is parallel to the transmission shaft.

Preferably, the first motor is located on one side of the axis of the transmission shaft, the second motor is located on the other side of the axis of the transmission shaft, and the first motor shaft and the second motor shaft are parallel to each other.

Preferably, the first motor and the speed change mechanism are located on one side of the axis of the transmission shaft, and the second motor is located on the other side of the axis of the transmission shaft.

Preferably, both the second motor shaft and the first motor shaft are perpendicular to the transmission shaft.

Preferably, the first motor is located on one side of the axis of the transmission shaft, the second motor is located on the other side of the axis of the transmission shaft, and the first motor shaft and the second motor shaft are perpendicular to each other.

Preferably, the first motor is located on one side of the axis of the transmission shaft, and the second motor and the speed change mechanism are located on the other side of the axis of the transmission shaft.

Preferably, the first motor shaft is perpendicular to the transmission shaft, and the second motor shaft is parallel to the transmission shaft.

Preferably, the engine system further comprises a bolt, wherein the bolt passes through the end of the first motor shaft, and the bolt is connected to the output end of the crankshaft part.

Preferably, a tapered hole is formed in the first motor shaft, the output end of the crankshaft part is configured as a tapered output end, and the output end of the crankshaft part is fitted in the tapered hole.

Correspondingly, an embodiment of the present disclosure further provides an all-terrain vehicle, comprising the engine system described above, and further comprising:
- a vehicle body on which the engine system is provided;
- a front wheel, which is provided on a front side of the vehicle body;
- a rear wheel, which is provided on a rear side of the vehicle body;
- a first main transmission shaft, which is drivingly connected to one of both ends of the transmission shaft which are along an axis of the transmission shaft, to transmit the fourth power to the front wheel;
- a second main transmission shaft, which is drivingly connected to the other end of the both ends of the transmission shaft which are along the axis of the transmission shaft, to transmit the fourth power to the rear wheel.

In the technical solution provided by the embodiment of the present disclosure, the engine, the first motor, the second motor, the speed change mechanism and the transmission shaft are integrated as a whole through the housing, wherein the engine drives the first motor to generate electricity, so that the first motor can provide electric energy to the second motor, and the second motor can drive the transmission shaft to output power through the speed change mechanism. The engine and the second motor are independent of each other and can run independently, so that the first power output by the engine can only be used for the first motor to generate electricity. The engine can work at an ideal rotating speed, so that the engine system can save fuels. In addition, the second motor outputs power to the outside, thus achieving rapid power response and easily obtaining excellent power performance.

BRIEF DESCRIPTION OF THE DRAWINGS

In order to explain the embodiments of the present disclosure or the technical solution in the prior art more clearly, the drawings needed in the description of the embodiments or the prior art will be briefly introduced. Obviously, the drawings in the following description are some embodiments of the present disclosure. For those skilled in the art, other drawings can be obtained according to these drawings without creative labor.

DETAILED DESCRIPTION OF THE EMBODIMENTS

In order to make those skilled in the art better understand the solution of the present disclosure, the technical solution in the embodiment of the present disclosure will be clearly and completely described hereinafter with reference to the drawings in the embodiment of the present disclosure. Obviously, the described embodiments are part of the embodiments of the present disclosure, rather than all of the embodiments. Based on the embodiments in the present disclosure, all other embodiments obtained by those skilled in the art without creative labor belong to the scope of protection in the present disclosure.

It should be noted that in the description of the present disclosure, the terms "first" and "second" are only used for convenience in describing different parts or names, and cannot be understood as indicating or implying the sequential relationship and relative importance or implicitly indicating the number of indicated technical features. Therefore, the features defined with "first" and "second" can include at least one of these features explicitly or implicitly.

Unless otherwise defined, all technical and scientific terms used herein have the same meanings as commonly understood by those skilled in the technical field of the present disclosure. The terms used in the specification of the present disclosure are only for the purpose of describing specific embodiments, rather than limit the present disclosure.

Figure 1:
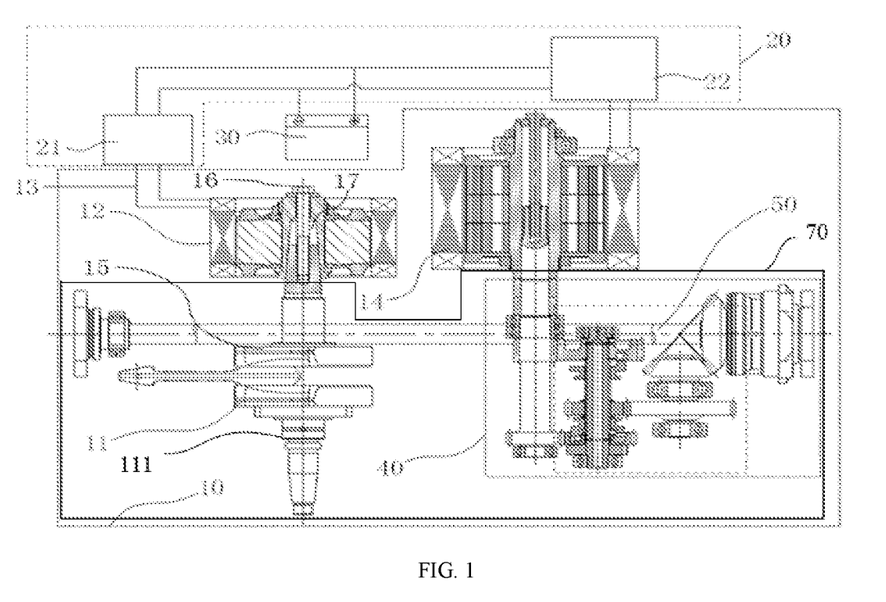
FIG. 1 is a structural schematic diagram of a first implementation of an engine system according to an embodiment of the present disclosure.

FIG. 1 is a structural schematic diagram of an engine system according to an embodiment of the present disclosure. As shown in FIG. 1, the engine system comprises a housing 70, an engine 11, a first motor 12, a second motor 14, a speed change mechanism 40 and a transmission shaft 50.

The housing 70 is provided with an accommodating cavity. The engine 11 is provided in the accommodating cavity and outputs first power, and an output end of the engine 11 for outputting the first power extends out of the accommodating cavity. The engine 11 may be a fuel engine, such as a gasoline engine, a diesel engine, or a gas engine, which is not particularly limited by the embodiment. It should be noted that in FIG. 1, only a crankshaft part 111 of the engine 11 is shown, and the end of the crankshaft is configured as the output end of the engine 11. Other components such as a cylinder of the engine 11 are not shown.

The first motor 12 is located outside the accommodating cavity and provided on the housing 70. The first motor 12 comprises a first motor shaft. The first motor shaft is connected to the output end of the engine 11 to convert the first power into electric energy. The first motor 12 refers to a mechanical device that converts other forms of energy into electrical energy. For example, the first motor 12 can be a generator. In this embodiment, the first motor 12 is connected to the engine 11, and can convert the mechanical energy output by the engine 11 into electric energy, thus realizing the conversion of mechanical energy into electric energy.

The second motor 14 is located outside the accommodating cavity and provided on the housing 70. The second motor 14 comprises a second motor shaft, and is configured to output second power according to electric energy. For example, the second motor 14 can be electrically connected to the first motor 12. The second motor 14 can run by the electric energy provided by the first motor 12, that is, realizing the conversion of electric energy into mechanical energy. The second motor 14 has high driving efficiency and rapid power response, and can ensure the power performance, thus meeting the power demand of users.

The engine further comprises a speed change mechanism 40 and a transmission shaft 50. The speed change mechanism 40 is provided in the accommodating cavity and drivingly connected to the second motor 14, and is configured to perform speed change processing on the second power to output third power. The speed change mechanism 40 can perform speed change processing on the second power output by the second motor 14, such as deceleration and torque increase, so as to meet the power output demand.

The transmission shaft 50 is provided in the accommodating cavity. The transmission shaft 50 is connected to the output end of the speed change mechanism 40 for outputting the third power. The transmission shaft 50 extends out of the accommodating cavity along both ends of the axis and is configured to output the fourth power. For example, the engine system is installed on a vehicle, the transmission shaft 50 can be connected to the front axle and the rear axle of the vehicle, the second motor 14 is connected to the speed change mechanism 40, and the second motor 14 outputs the second power to the speed change mechanism 40. After speed change processing is performed on the second power by the speed change mechanism 40, the third power is output. The third power is transmitted by the transmission shaft 50, so that the transmission shaft 50 outputs the fourth power. The fourth power is output to the front axle and the rear axle of the vehicle, thereby being output to the traveling wheels of the vehicle to drive the traveling wheels to rotate.

In the technical solution provided by the embodiment of the present disclosure, the engine 11, the first motor 12, the second motor 14, the speed change mechanism 40 and the transmission shaft 50 are integrated as a whole through the housing 70, wherein the engine 11 drives the first motor 12 to generate electricity, so that the first motor 12 provides electric energy to the second motor 14, and the second motor 14 drives the transmission shaft 50 to output power through the speed change mechanism 40 to output the fourth power. The engine 11 and the second motor 14 are independent of each other, and can run independently, so that the first power output by the engine 11 can only be used for the first motor 12 to generate electricity. The engine 11 can work at an ideal rotating speed, so that the engine system can save fuels. In addition, the second motor 14 outputs power to the outside, thus achieving rapid power response and easily obtaining excellent power performance.

Further, in order to make the structure of the engine system more compact, the integration degree of various functional components is high, and the purpose of making full use of the accommodating space is achieved. In the embodiment of the present disclosure, there are various types of arrangement modes of various functional components in the engine system. The arrangement modes of various functional components in the engine system will be described hereinafter with reference to FIGS. 1 to 5. It should be noted that according to the angle of view shown in the figures, the upper part of the transmission shaft 50 is defined as a first side of the transmission shaft 50, and the lower part of the transmission shaft 50 is defined as a second side of the transmission shaft 50.

Figure 2:
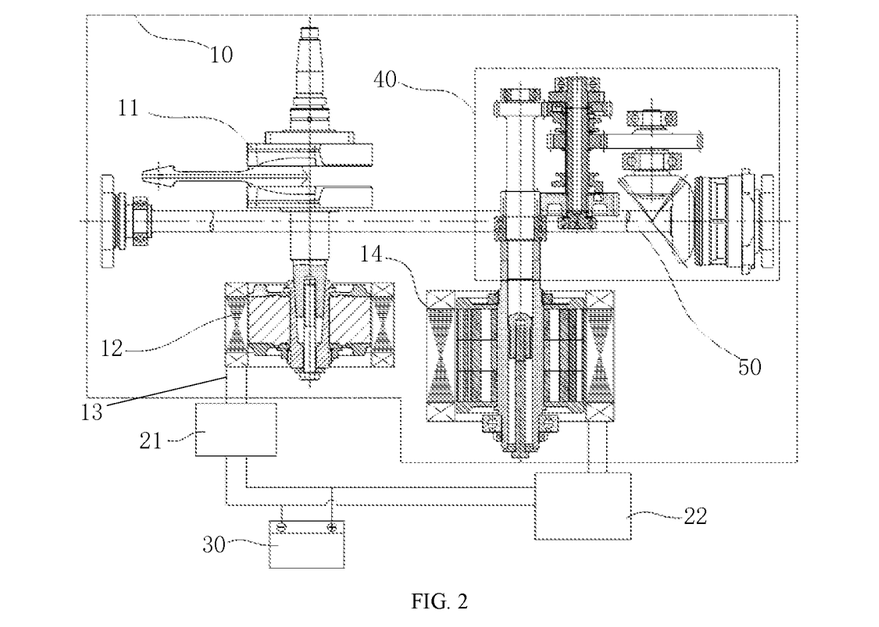
FIG. 2 is a structural schematic diagram of a second implementation of an engine system according to an embodiment of the present disclosure.

As shown in FIGS. 1 and 2, one possible arrangement mode is that the first motor 12 and the second motor 14 are located on the same side of the axis of the transmission shaft 50, and the first motor shaft and the second motor shaft are parallel to each other. As shown in FIG. 1, both the first motor 12 and the second motor 14 are located on the first side of the axis of the transmission shaft 50. Alternatively, as shown in FIG. 2, both the first motor 12 and the second motor 14 are located at the second side of the axis of the transmission shaft 50. With this arrangement mode, the distance between the first motor 12 and the second motor 14 is relatively short, and the electric energy output by the first motor 12 can be transmitted to the second motor 14 through a short transmission path, thus reducing the electric energy loss and improving the utilization rate of electric energy. At the same time, the structure between the first motor 12 and the second motor 14 is more compact so as to be suitable for different accommodating spaces, and the accommodating spaces can be fully utilized.

Further, with continued reference to FIGS. 1 and 2, the first motor 12 and the second motor 14 are located on one side of the axis of the transmission shaft 50, and the counterweight 15 of the crankshaft part 111 and the speed change mechanism 40 are located on the other side of the axis of the transmission shaft 50. As shown in FIG. 1, both the first motor 12 and the second motor 14 are located on the first side of the axis of the transmission shaft 50, and at the same time, both the counterweight 15 of the crankshaft part 111 and the speed change mechanism 40 are located on the second side of the axis of the transmission shaft 50. Alternatively, as shown in FIG. 2, both the first motor 12 and the second motor 14 are located on the second side of the axis of the transmission shaft 50, and at the same time, both the counterweight 15 of the crankshaft part 111 and the speed change mechanism 40 are located on the first side of the axis of the transmission shaft 50.

In this arrangement mode, the counterweight 15 of the crankshaft part 111 and the first motor 12 are located on both sides of the axis of the transmission shaft 50, respectively. For example, the crankshaft part 111 of the engine 11 is provided across the transmission shaft 50. The second motor 14 and the speed change mechanism 40 are located on both sides of the axis of the transmission shaft 50, respectively. For example, the second motor shaft of the second motor 14 is provided across the transmission shaft 50. Compared with the space position, each functional part is more compact in structure, occupies less space, and is suitable for different accommodating spaces.

As shown in FIGS. 1 and 2, both the second motor shaft and the first motor shaft are perpendicular to the transmission shaft 50. The first motor 12 and the second motor 14 provided in this way can reasonably utilize the space perpendicular to the direction of the transmission shaft 50, so that the whole engine system is more compact and more stable.

Figure 3:
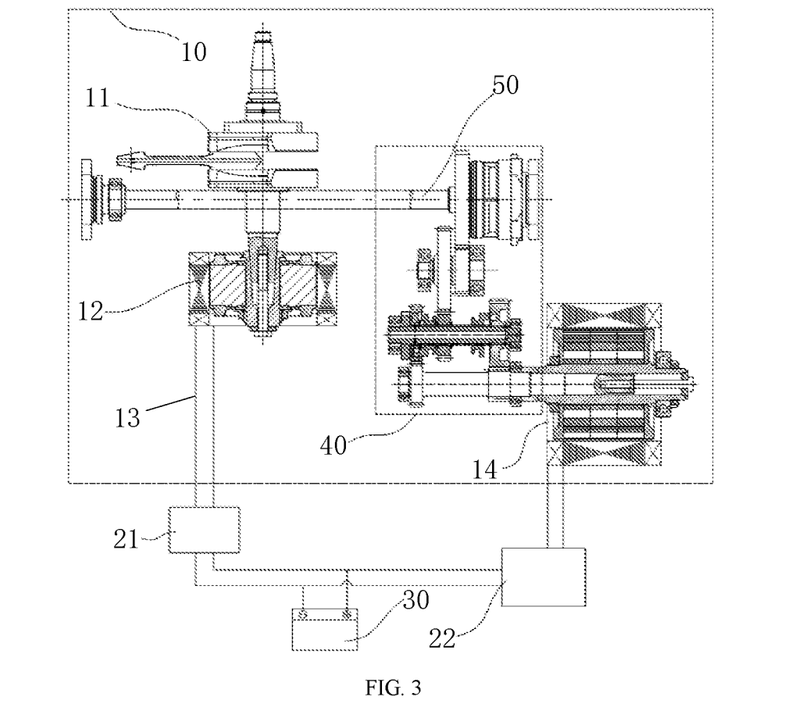
FIG. 3 is a structural schematic diagram of a third implementation of an engine system according to an embodiment of the present disclosure.

As shown in FIG. 3, in the embodiment of the present disclosure, another possible arrangement mode of the engine system is that the first motor 12 and the second motor 14 are located on the same side of the axis of the transmission shaft 50 and the first motor shaft and the second motor shaft are perpendicular to each other. With this arrangement mode, compared with the space position, the first motor 12 and the second motor 14 reasonably utilize the accommodating space, and at the same time, the axial rotation directions of the first motor shaft and the second motor shaft are perpendicular to each other, thus effectively avoiding the resonance phenomenon generated during coaxial rotation, reducing the vibration of the engine system and reducing the running noise.

Further, with continued reference to FIG. 3, preferably, the first motor 12, the second motor 14 and the speed change mechanism 40 are located on one side of the axis of the transmission shaft 50, and the counterweight 15 of the crankshaft portion is located on the other side of the axis of the transmission shaft 50. With this arrangement mode, the counterweight 15 of the crankshaft part and the first motor 12 are located on both sides of the axis of the transmission shaft 50, respectively. For example, the crankshaft part of the engine 11 is provided across the transmission shaft 50. Compared with the spatial position, the engine 11 and the first motor 12 is more compact in structure, and the occupied space is reduced. The second motor 14 and the speed change mechanism 40 are located on the same side of the axis of the transmission shaft 50, so that the transmission distance between the second motor 14 and the speed change mechanism 40 can be reduced to improve the transmission sensitivity between the speed change mechanism 40 and the second motor 14.

As shown in FIG. 3, the first motor shaft is perpendicular to the transmission shaft 50, and the second motor shaft is parallel to the transmission shaft 50. In this way, on the one hand, the first motor 12 can be in transmission match with the crankshaft part conveniently, and on the other hand, the second motor 14 can be in transmission match with the speed change mechanism 40 conveniently.

Figure 4:
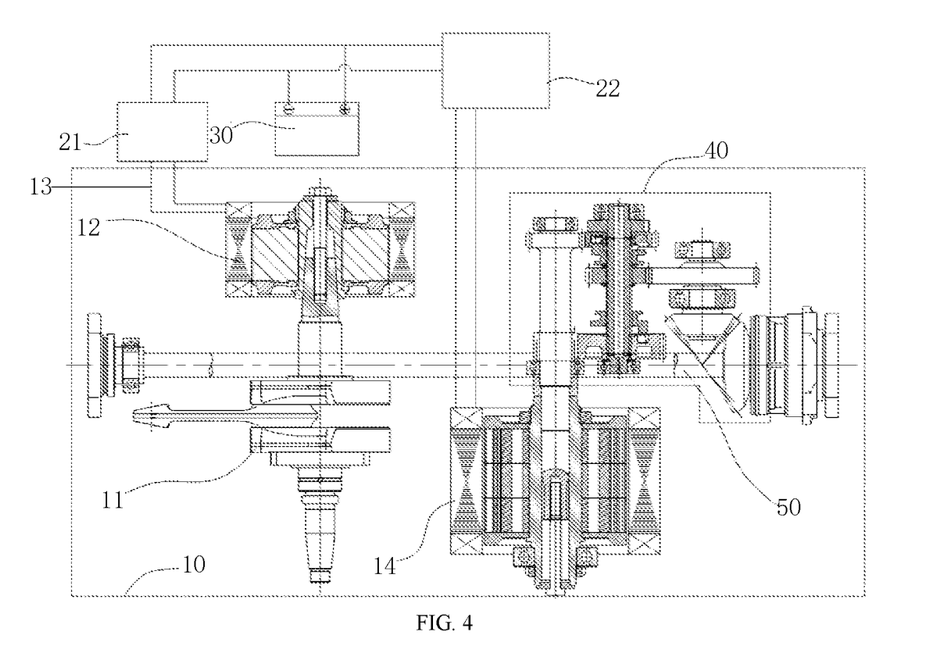
FIG. 4 is a structural schematic diagram of a fourth implementation of an engine system according to an embodiment of the present disclosure.

As shown in FIG. 4, in the embodiment of the present disclosure, another possible arrangement mode of the engine system is that the first motor 12 is located on one side of the axis of the transmission shaft 50, the second motor 14 is located on the other side of the axis of the transmission shaft 50, and the first motor shaft and the second motor shaft are parallel to each other. With this arrangement mode, compared with the space position, the first motor 12 and the second motor 14 are suitable for different accommodating spaces, and the accommodating spaces can be fully utilized. Further, with continued reference to FIG. 4, the first motor 12 and the speed change mechanism 40 are located on one side of the axis of the transmission shaft 50, and the second motor 14 and the counterweight 15 of the crankshaft portion are located on the other side of the axis of the transmission shaft 50.

As shown in FIG. 4, both the second motor shaft and the first motor shaft are perpendicular to the transmission shaft 50. The first motor 12 and the second motor 14 provided in this way can reasonably utilize the space perpendicular to the direction of the transmission shaft 50, so that the whole engine system is more compact and more stable.

Figure 5:
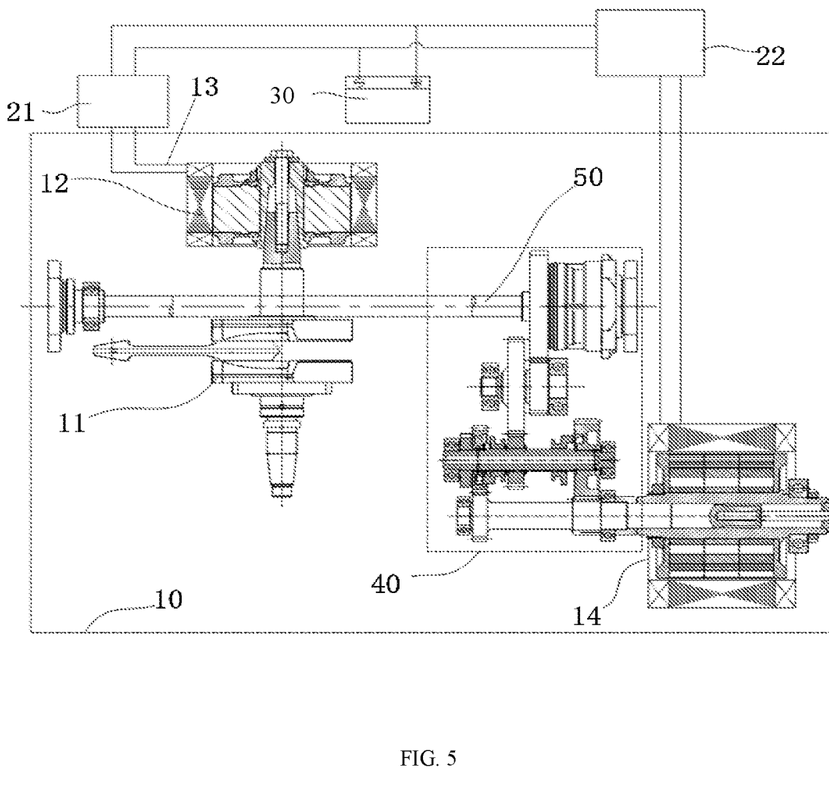
FIG. 5 is a structural schematic diagram of a fifth implementation of an engine system according to an embodiment of the present disclosure.

As shown in FIG. 5, in the embodiment of the present disclosure, another possible arrangement mode of the engine system is that the first motor 12 is located on one side of the axis of the transmission shaft 50, the second motor 14 is located on the other side of the axis of the transmission shaft 50, and the first motor shaft and the second motor shaft are perpendicular to each other. With this arrangement mode, compared with the space position, the first motor 12 and the second motor 14 reasonably utilize the accommodating space, and at the same time, the axial rotation directions of the first motor shaft and the second motor shaft are perpendicular to each other, thus effectively avoiding the resonance phenomenon generated during coaxial rotation, reducing the vibration of the engine system and reducing the running noise. Further, the first motor 12 is located on one side of the axis of the transmission shaft 50, and the second motor 14, the engine 11 and the speed change mechanism 40 are located on the other side of the axis of the transmission shaft.

As shown in FIG. 5, the first motor shaft is perpendicular to the transmission shaft 50, and the second motor shaft is parallel to the transmission shaft 50. In this way, on the one hand, the first motor 12 can be in transmission match with the crankshaft part conveniently, and on the other hand, the second motor 14 can be in transmission match with the speed change mechanism 40 conveniently.

As shown in FIG. 1, the engine system further comprises a bolt 16. The bolt 16 passes through the end of the first motor shaft, and the bolt 16 is connected to the output end of the engine 11. That is, the engine system can connect the first motor shaft and the output end of the crankshaft part by the bolt 16, so that on the one hand, the installation reliability between the first motor shaft and the output end of the engine 11 can be improved, and on the other hand, the installation difficulty between the first motor shaft and the output end of the engine 11 can be reduced. The output end of the engine 11 may be formed with a threaded hole, and the bolt 16 is screwed with the threaded hole.

Specifically, as shown in FIG. 1, a tapered hole 17 is formed in the first motor shaft, the output end of the engine 11 is configured as a tapered output end, and the output end of the engine 11 is fitted in the tapered hole 17. The tapered hole 17 and the tapered output end are provided, so that on the one hand, it is convenient to match therebetween, and on the other hand, it is beneficial to the power transmission therebetween, thus improving the power transmission stability of the engine system.

The housing can be a single housing. The engine 11, the speed change mechanism 40 and the transmission shaft 50 are all provided in the accommodating cavity. Of course, the housing can also be the housing of the engine 11, that is, the housing of the engine 11 can be directly used as the housing of the engine system. The crankshaft part, the speed change mechanism 40 and the transmission shaft 50 are all provided in the accommodating cavity.

It should be noted that the above description of different arrangement modes of various functional components in the engine system through FIGS. 1 to 5 is only schematic, aiming at concisely explaining the technical features of the embodiment of the present disclosure, so that those skilled in the art can intuitively understand the technical feature of the embodiment of the present disclosure, which is not taken as improper limitation of the embodiment of the present disclosure.

The engine system provided by the above embodiments can be installed on vehicles, aircrafts, robots and other machines. Vehicles include, but are not limited to, all-terrain vehicles, as well as existing manned vehicles, unmanned vehicles, distribution trolleys, etc. Robots are not limited to field robots, etc. Aircrafts can include, but are not limited to, agricultural aircrafts, patrol aircrafts, etc.

Figure 6:
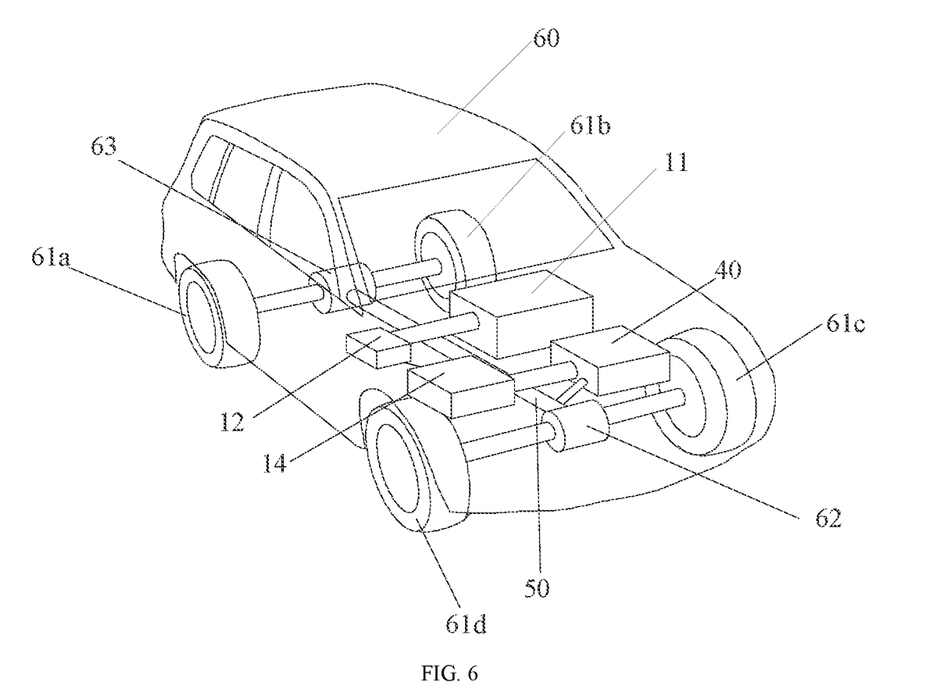
FIG. 6 is a structural schematic diagram of the principle of a vehicle according to an embodiment of the present disclosure.

Taking the vehicle as an example hereinafter, refer to the structural schematic diagram of a vehicle embodiment shown in FIG. 6. The vehicle comprises a vehicle body and an engine system provided on the vehicle body. The engine system can be realized by the engine system described in the above embodiments.

Specifically, the embodiment of the present disclosure provides a vehicle, which comprises the engine system in the above embodiment and further comprises a vehicle body 60, and front wheels, rear wheels, a first main transmission shaft 62 and a second main transmission shaft 63 provided on the vehicle body 60. The engine system is provided on the vehicle body 60. The front wheels are provided on the front side of the vehicle body 60. The rear wheels are provided on the rear side of the vehicle body 60. The first main transmission shaft 62 is drivingly connected to one of both ends of the transmission shaft 50 which are along an axis of the transmission shaft 50, to transmit the fourth power to the front wheels. The second main transmission shaft 63 is drivingly connected to the other end of the both ends of the transmission shaft 50 which are along the axis of the transmission shaft 50, to the fourth power to the rear wheels.

It should be noted that the front wheels and rear wheels on the vehicle body 60 can be set in different numbers according to different types of vehicles. In the embodiment of the present disclosure, taking the vehicle shown in FIG. 6 as an example, there are four front wheels and rear wheels in total, namely 61a to 61d, where 61a and 61b are rear wheels of vehicles, and 61c and 61d are front wheels of vehicles.

The engine system is provided on the vehicle body 60, and is configured to output corresponding traveling power to the front wheels and the rear wheels through the first main transmission shaft 62 and the second main transmission shaft 63. As shown in FIGS. 1 and 6, the engine system comprises a housing and a power output unit 10.

The housing is provided with an accommodating cavity. The power output unit 10 comprises an engine 11, a first motor 12, a second motor 14, a speed change mechanism 40 and a transmission shaft 50. The engine 11 is provided in the accommodating cavity and outputs first power. The output end of the engine 11 for outputting the first power extends out of the accommodating cavity. The engine 11 may be a fuel engine, such as a gasoline engine, a diesel engine, or a gas engine, which is not particularly limited by the embodiment. It should be noted that in FIG. 1, only a crankshaft part of the engine 11 is shown. Other components such as a cylinder of the engine 11 are not shown.

The first motor 12 is located outside the accommodating cavity and provided on the housing. The first motor 12 comprises a first motor shaft. The first motor shaft is connected to the output end of the engine 11 and is configured to convert the first power into electric energy. The first motor 12 refers to a mechanical device that converts other forms of energy into electrical energy. For example, the first motor 12 can be a generator. In this embodiment, the first motor 12 is connected to the engine 11, and can convert the mechanical energy output by the engine 11 into electric energy, thus realizing the conversion of mechanical energy into electric energy.

The second motor 14 is located outside the accommodating cavity and provided on the housing. The second motor 14 comprises a second motor shaft, and is configured to output second power according to electric energy. For example, the second motor 14 can be electrically connected to the first motor 12. The second motor 14 can run by the electric energy provided by the first motor 12, that is, realizing the conversion of electric energy into mechanical energy. The second motor 14 has high driving efficiency and rapid power response, and can ensure the power performance, thus meeting the power demand of users.

The power output unit 10 further comprises a speed change mechanism 40 and a transmission shaft 50. The speed change mechanism 40 is provided in the accommodating cavity and drivingly connected to the second motor 14, and is configured to perform speed change processing on the second power to output third power. The speed change mechanism 40 can perform speed change processing on the second power output by the second motor 14, such as deceleration and torque increase, so as to meet the power output demand.

The transmission shaft 50 is provided in the accommodating cavity. The transmission shaft 50 is connected to the output end of the speed change mechanism 40 for outputting the third power. The transmission shaft 50 extends out of the accommodating cavity along both ends of the axis and is configured to output the fourth power. For example, the engine system is installed on a vehicle, the transmission shaft 50 can be connected to the first main transmission shaft 62 and the second main transmission shaft 63 of the vehicle, the second motor 14 is connected to the speed change mechanism 40, and the second motor 14 outputs the second power to the speed change mechanism 40. After speed change processing is performed on the second power by the speed change mechanism 40, the third power is output. The third power is transmitted by the transmission shaft 50, so that the transmission shaft 50 outputs the fourth power. The fourth power is output to the first main transmission shaft 62 and the second main transmission shaft 63 of the vehicle, thereby being output to the front wheels and the rear wheels of the vehicle to drive the front wheels and the rear wheels to rotate.

In the technical solution provided by the embodiment of the present disclosure, the problems of large exhaust emission of the fuel engine, the endurance of a pure motor, field charging and the like in the prior art can be solved. The power output unit 10 has a high degree of integration. The engine 11, the first motor 12, the second motor 14, the speed change mechanism 40 and the transmission shaft 50 are integrated as a whole through the housing, wherein the engine 11 drives the first motor 12 to generate electricity, so that the first motor 12 provides electric energy to the second motor 14, and the second motor 14 drives the transmission shaft 50 to output power through the speed change mechanism 40 to output the fourth power. The engine 11 and the second motor 14 are independent of each other, and can run independently, so that the first power output by the engine 11 can only be used for the first motor 12 to generate electricity. The engine 11 can work at an ideal rotating speed, so that the engine system can save fuels. In addition, the second motor 14 outputs power to the outside, thus achieving rapid power response and easily obtaining excellent power performance.

Further, in the embodiment of the present disclosure, the vehicle is provided with an accommodating space, and the power output unit 10 can be integrally installed in the accommodating space. In order to make all components of the power output unit 10 make full use of the occupied space, the first motor 12 and the second motor 14 of the power output unit 10 can be arranged using the installation position of the CVT (Continuously Variable Transmission) of the existing vehicle. The transmission efficiency can be effectively improved by controlling the rotation speed of the second motor 14 instead of the variable speed of the CVT.

Further, in order to cooperate with the operation of the engine system, with continued reference to FIGS. 1 to 5, the vehicle provided in this embodiment further comprises a connecting circuit 13, a control unit 20 and a storage battery 30. The first motor 11 and the second motor 14 are both electrically connected to the connecting circuit 13, wherein the second motor 14 can be configured to start, adjust or stop the second power output to the outside according to the electric signal transmitted on the connecting circuit 13. The control unit 20 and the storage battery 30 are both electrically connected to the connecting circuit 13. The control unit 20 is configured to output a corresponding electrical signal through the connection circuit 13. The storage battery is configured to store or release electric energy through the connecting circuit 13.

The first motor 12 is electrically connected to the connecting circuit 13, and can output electric energy to the outside through the connecting circuit 13. The electric energy generated by the first motor 12 can be stored in the storage battery 30 through the connecting circuit 13 or supply power to the second motor 14 through the connecting circuit 13. The control unit 20 is electrically connected to the connecting circuit 13, and outputs a corresponding electrical signal through the connecting circuit 13. The control unit 20 can provide the functions of starting and stopping the engine, measuring operation data, fault protection, etc., and can further provide the functions of measuring and protecting the electric quantity of the first motor.

The connecting circuit 13 can be connected to the overall control system of the vehicle equipped with the engine system provided in this embodiment, so as to send a corresponding electrical signal to the overall control system of the vehicle through the connecting circuit 13.

The second motor 14 is electrically connected to the connecting circuit 13, and is configured to start, adjust or stop the second power output to the outside according to the electric signal transmitted on the connecting circuit 13. The second motor 14 can be operated by the electric energy provided by the connecting circuit 13, that is, realizing the conversion of electric energy into mechanical energy. The second motor 14 has high driving efficiency and rapid power response, and can ensure the power performance, thus meeting the power demand of users.

The storage battery 30 is electrically connected to the connecting circuit 13 for storing or releasing electric energy through the connecting circuit 13. For example, the control unit 20 can control the operation mode of the first motor 12, such as supplying electric energy to the second motor 14 or supplying electric energy to the storage battery 30. The control unit 20 can control the operation mode of the storage battery 30, such as controlling the storage battery 30 to store or release electric energy.

In the embodiment of the present disclosure, a realizable mode of the control unit 20 is a control module integrated with the first motor controller and the second motor controller. The control module can be an FPGA, a chip, etc., on which functional programs required by the first motor controller and the second motor controller are configured.

In another realizable solution, as shown in FIG. 1, the control unit 20 comprises a first controller 21 and a second controller 22. The first controller 21 is connected to the first motor 12, and is configured to control the electric energy output by the first motor 12 to be stored in the storage battery 30 and/or supplied to the second motor 14 through the connecting circuit 13. The transmission mode of the electric energy output by the first motor 12 can be controlled by the first controller 21. The electric energy output by the first motor 12 is managed and stored in the storage battery 30 by the first controller 21, or the first motor 12 is controlled by the first controller 21 to provide electric energy to the second motor 14 in real time by the second controller 22, or the electric energy output by the first motor 12 supplies power to the storage battery 30 and the second motor 14 at the same time.

In addition, the first controller 21 can also be configured to provide the functions of starting and stopping the engine 12, measuring operation data, fault protection, etc., and can further provide the functions of measuring and protecting the electric quantity of the first motor. The first controller 21 can be directly selected from the first motor controllers in the prior art, and the implementation structure and functions of the first motor controller are not specifically limited in this embodiment.

The second controller 22 is connected to the second motor 14, and is configured to control the second motor 14 to operate according to the received electric signal, so as to start, adjust or stop the second power output to the outside. The function of the second controller 22 is to convert the electric energy stored in the storage battery 30 into the electric energy required by the second motor 14 according to the gear, the throttle, the brake and other instructions, so as to control the running state of the vehicle such as starting and running, advancing and retreating speed, climbing strength, etc.; or help the vehicle to brake and store part of the braking energy in the storage battery 30.

It should be noted that the control unit 20 can be integrated into a general control unit (such as a main control panel) of a vehicle or an aircraft. Of course, the control unit 20 can also be a module independent of the general control unit of a vehicle or an aircraft, and the control unit 20 is communicatively connected to the general control unit. The storage battery 30 can be directly used in an existing vehicle or aircraft.

When the vehicle is running, the second motor 14 does not need to be in the running state all the time. For example, when the vehicle is braking, decelerating or going downhill, the second motor 14 can stop outputting power to the outside under the control of the second controller 22. In this case, under the inertia of the vehicle, the traveling wheel will still rotate. In the embodiment of the present disclosure, the second motor 14 can also be configured to convert mechanical energy into electrical energy and store the electrical energy in the storage battery 30. Specifically, when the second motor 14 stops outputting the second power to the outside, the transmission shaft 50 transmits the rotating force of the first main transmission shaft 62 and/or the second main transmission shaft 63 of the vehicle to the second motor 14 through the speed change mechanism 40. The second motor 14 can convert the rotating force of the first main transmission shaft 62 and/or the second main transmission shaft 63 into electric energy, and provide charging current to the storage battery 30 through the connecting circuit 13.

For example, when the vehicle is going downhill, the rotation of the traveling wheel can be realized by the inertia of the vehicle and its own gravity. Because the traveling wheel of the vehicle does not require the second motor 14 to provide power, the second motor 14 can stop outputting power to the outside under the control of the second controller 22, and the first motor 12 and the storage battery 30 do not provide electric energy to the second motor 14. During rotation, the traveling wheel drives the first main transmission shaft 62 and/or the second main transmission shaft 63 of the vehicle to rotate. The first main transmission shaft 62 and/or the second main transmission shaft 63 drives the second motor 14 to rotate through the transmission shaft 50. The rotation of the second motor 14 converts mechanical energy into electrical energy. The electrical energy generated by the second motor 14 can be stored in the storage battery 30 through the connecting circuit 13, so that the excess mechanical energy is recovered into the storage battery 30 by the second motor 14 when the vehicle is braking, decelerating or going downhill, thus reducing the energy consumption and prolonging the endurance mileage.

To sum up, in the technical solution provided by the embodiment of the present disclosure, the problems of large exhaust emission of the fuel engine, the endurance of a pure motor, field charging and the like in the prior art can be solved. According to the technical solution provided by the embodiment of the present disclosure, the power output unit has a high degree of integration. The first power output by the engine is only used to drive the first motor to generate electricity, and does not participate in the driving of the vehicle, so that the engine can always run at an ideal rotating speed, reduce the fuel consumption and emission index, and effectively reduce the fuel consumption. The first motor and the motor are structurally integrated as a whole, but are independent of each other in functions and can run independently. The motor can be driven by the electric energy provided by the first motor or the storage battery to output the second power. The motor is high in driving efficiency and rapid in power response, and can provide strong driving force to ensure the power performance of the vehicle and fully meet the demand of users.

The technical solution provided by the embodiment of the present disclosure is further introduced in detail through specific use scenarios hereinafter.

Taking an all-terrain vehicle as an example, the all-terrain vehicle has been favored by the market for its excellent ability to travel in the field. An all-terrain vehicle, which is mainly powered by fuel and travels in the field, has strong driving ability, but high fuel consumption and heavy pollution. However, the emerging pure electric all-terrain vehicle is subject to the problems of endurance and field charging. The engine system provided by the embodiment of the present disclosure is suitable for an all-terrain vehicle. The engine system is installed on the all-terrain vehicle, which can provide strong power performance for the all-terrain vehicle, so as to realize excellent off-road performance of vehicles and meet the demand of customers for enjoying outdoor driving pleasure.

The power output unit 10 can be integrated into the accommodating space of the all-terrain vehicle for installing the power system. The power output unit 10 has a high degree of integration. The first power output by the engine 11 is only used to drive the first motor 12 to generate electricity, and does not participate in the driving of the vehicle, so that the engine can always run at an ideal rotating speed, reduce the fuel consumption and emission index, and effectively reduce the fuel consumption. The second motor 14 can be driven by the electric energy provided by the first motor 12 or the storage battery 30 to output the second power. The second motor 14 is high in driving efficiency and rapid in power response, and can provide strong driving force to ensure the power performance of the vehicle and fully meet the demand of users.

At the same time, when the all-terrain vehicle is braking, decelerating and going downhill, the second motor 14 can stop rotating under the control of the second controller 22. In this case, the front wheels and the rear wheels of the vehicle will still rotate under the action of inertia. When the front wheels and the rear wheels rotate, the first main transmission shaft 62 and the second main transmission shaft 63 of the vehicle are driven to rotate. The first main transmission shaft 62 and the second main transmission shaft 63 drive the second motor 14 to rotate. The rotation of the second motor 14 converts mechanical energy into electrical energy. The electrical energy generated by the second motor 14 can be stored in the storage battery 30 through the connecting circuit 13, so that the excess mechanical energy is recovered into the storage battery 30 by the second motor 14 when the vehicle is braking, decelerating or going downhill, thus reducing the energy consumption and prolonging the endurance mileage.

It should be noted that although the specific embodiments of the present disclosure have been described in detail with reference to the drawings, it should not be understood as limiting the scope of protection of the present disclosure. Within the scope described in the claims, various modifications and variations that can be made by those skilled in the art without creative labor still belong to the scope of protection of the present disclosure.

The examples of the embodiments of the present disclosure are intended to concisely explain the technical features of the embodiments of the present disclosure, so that those skilled in the art can intuitively understand the technical features of the embodiments of the present disclosure, which are not taken as improper limitations of the embodiments of the present disclosure.

Finally, it should be explained that the above embodiments are only used to illustrate the technical solution of the present disclosure, rather than limit the technical solution. Although the present disclosure has been described in detail with reference to the foregoing embodiments, it should be understood by those skilled in the art that it is still possible to modify the technical solutions described in the foregoing embodiments, or equivalently replace some of the technical features. These modifications or replacements do not make the essence of the corresponding technical solutions deviate from the spirit and scope of the technical solutions of the embodiments of the present disclosure.

What is claimed is:

1. An engine system, comprising:
   a housing, which is provided with an accommodating cavity;
   a crankshaft part, which is provided in the accommodating cavity and is configured to output first power, wherein an output end of the crankshaft part for outputting the first power extends out of the accommodating cavity;
   a first motor, which is located outside the accommodating cavity and provided on the housing, wherein the first motor comprises a first motor shaft, and the first motor shaft is connected to the output end of the crankshaft part to convert the first power into electric energy;
   a second motor, which is located outside the accommodating cavity and provided on the housing, wherein the second motor comprises a second motor shaft and is configured to output second power according to electric energy;
   a speed change mechanism, which is provided in the accommodating cavity and drivingly connected to the second motor shaft without connecting to the output end of the crankshaft part, and is configured to perform speed change processing on the second power to output third power; and
   a transmission shaft, which is provided in the accommodating cavity and connected to an output end of the speed change mechanism for outputting the third power, and is configured to output fourth power.

2. The engine system according to claim 1, wherein the first motor and the second motor are located on a same side of an axis of the transmission shaft, the first motor shaft and the second motor shaft are parallel to each other, and the second motor shaft and the first motor shaft are perpendicular to the transmission shaft.

3. The engine system according to claim 2, wherein the first motor and the second motor are located on one side of the axis of the transmission shaft, and the speed change mechanism is located on the other side of the axis of the transmission shaft.

4. The engine system according to claim 1, wherein the first motor and the second motor are located on a same side of an axis of the transmission shaft, the first motor shaft and the second motor shaft are perpendicular to each other, and the first motor shaft is perpendicular to the transmission shaft, and the second motor shaft is parallel to the transmission shaft.

5. The engine system according to claim 4, wherein the first motor, the second motor and the speed change mechanism are located on one side of the axis of the transmission shaft, and a counterweight of the crankshaft part is located on the other side of the axis of the transmission shaft.

6. The engine system according to claim 1, wherein the first motor is located on one side of an axis of the transmission shaft, the second motor is located on the other side of the axis of the transmission shaft, the first motor shaft and the second motor shaft are parallel to each other, and both the second motor shaft and the first motor shaft are perpendicular to the transmission shaft.

7. The engine system according to claim 6, wherein the first motor and the speed change mechanism are located on one side of the axis of the transmission shaft, and the second motor is located on the other side of the axis of the transmission shaft.

8. The engine system according to claim 1, wherein the first motor is located on one side of an axis of the transmission shaft, the second motor is located on the other side of the axis of the transmission shaft, the first motor shaft and the second motor shaft are perpendicular to each other, and the first motor shaft is perpendicular to the transmission shaft, and the second motor shaft is parallel to the transmission shaft.

9. The engine system according to claim 8, wherein the first motor is located on one side of the axis of the transmission shaft, and the second motor and the speed change mechanism are located on the other side of the axis of the transmission shaft.

10. An all-terrain vehicle, comprising the engine system according to claim 1, and further comprising:
  a vehicle body on which the engine system is provided;
  a front wheel, which is provided on a front side of the vehicle body;
  a rear wheel, which is provided on a rear side of the vehicle body;
  a first main transmission shaft, which is drivingly connected to one of both ends of the transmission shaft which are along an axis of the transmission shaft, to transmit the fourth power to the front wheel;
  a second main transmission shaft, which is drivingly connected to the other end of the both ends of the transmission shaft which are along the axis of the transmission shaft, to transmit the fourth power to the rear wheel.

11. An engine system, comprising:
  an engine, which comprises a housing and a crankshaft part, wherein the housing is provided with an accommodating cavity, the crankshaft part is provided in the accommodating cavity and is configured to output first power, and an output end of the crankshaft part for outputting the first power extends out of the accommodating cavity;
  a first motor, which is located outside the accommodating cavity and provided on the housing, wherein the first motor comprises a first motor shaft, and the first motor shaft is connected to the output end of the crankshaft part to convert the first power into electric energy;
  a second motor, which is located outside the accommodating cavity and provided on the housing, wherein the second motor comprises a second motor shaft and is configured to output second power according to electric energy;
  a speed change mechanism, which is provided in the accommodating cavity and drivingly connected to the second motor shaft without connecting to the output end of the crankshaft part, and is configured to perform speed change processing on the second power to output third power; and
  a transmission shaft, which is provided in the accommodating cavity and connected to an output end of the speed change mechanism for outputting the third power, and is configured to output fourth power.

12. The engine system according to claim 11, wherein the first motor and the second motor are located on a same side of an axis of the transmission shaft, the first motor shaft and the second motor shaft are parallel to each other.

13. The engine system according to claim 12, wherein the first motor and the second motor are located on one side of the axis of the transmission shaft, and the speed change mechanism is located on the other side of the axis of the transmission shaft.

14. The engine system according to claim 11, wherein the second motor shaft and the first motor shaft are perpendicular to the transmission shaft.

15. The engine system according to claim 11, wherein the first motor and the second motor are located on a same side of an axis of the transmission shaft, the first motor shaft and the second motor shaft are perpendicular to each other, and the first motor shaft is perpendicular to the transmission shaft, and the second motor shaft is parallel to the transmission shaft.

16. The engine system according to claim 15, wherein the first motor, the second motor and the speed change mechanism are located on one side of the axis of the transmission shaft, and a counterweight of the crankshaft part is located on the other side of the axis of the transmission shaft.

17. The engine system according to claim 11, wherein the first motor is located on one side of an axis of the transmission shaft, the second motor is located on the other side of the axis of the transmission shaft, the first motor shaft and the second motor shaft are parallel to each other, and both the second motor shaft and the first motor shaft are perpendicular to the transmission shaft.

18. The engine system according to claim 17, wherein the first motor and the speed change mechanism are located on one side of the axis of the transmission shaft, and the second motor is located on the other side of the axis of the transmission shaft.

19. The engine system according to claim 11, wherein the first motor is located on one side of an axis of the transmission shaft, the second motor is located on the other side of the axis of the transmission shaft, the first motor shaft and the second motor shaft are perpendicular to each other, and the first motor shaft is perpendicular to the transmission shaft, and the second motor shaft is parallel to the transmission shaft.

20. The engine system according to claim 19, wherein the first motor is located on one side of the axis of the transmission shaft, and the second motor and the speed change mechanism are located on the other side of the axis of the transmission shaft.

* * * * *